(12) United States Patent
Hahn

(10) Patent No.: US 9,073,251 B2
(45) Date of Patent: Jul. 7, 2015

(54) FACILITY AND METHOD FOR PRODUCING CONTAINERS

(75) Inventor: Wolfgang Hahn, Neutraubling (DE)

(73) Assignee: KRONES AG (DE)

( * ) Notice: Subject to any disclaimer, the term of this patent is extended or adjusted under 35 U.S.C. 154(b) by 366 days.

(21) Appl. No.: 12/989,787

(22) PCT Filed: Apr. 28, 2009

(86) PCT No.: PCT/EP2009/055099
§ 371 (c)(1),
(2), (4) Date: Nov. 23, 2010

(87) PCT Pub. No.: WO2009/133087
PCT Pub. Date: Nov. 5, 2009

(65) Prior Publication Data
US 2011/0260372 A1    Oct. 27, 2011

(30) Foreign Application Priority Data
Apr. 30, 2008   (DE) .......................... 10 2008 021 527

(51) Int. Cl.
*B29C 49/78*     (2006.01)
*B29C 49/42*     (2006.01)
*B29C 49/06*     (2006.01)
*B29C 49/64*     (2006.01)
*B29K 105/26*    (2006.01)
(Continued)

(52) U.S. Cl.
CPC ............. *B29C 49/4205* (2013.01); *B29C 49/06* (2013.01); *B29C 49/42* (2013.01); *B29C 49/6409* (2013.01); *B29C 49/78* (2013.01); *B29K 2105/26* (2013.01); *B29L 2031/7158* (2013.01); *B67C 2003/227* (2013.01)

(58) Field of Classification Search
CPC ..................... B29C 49/78; B29C 2949/78781; B29C 2949/78991
USPC ........ 264/40.1, 40.6, 535; 425/161, 168, 526, 425/404
See application file for complete search history.

(56) References Cited

U.S. PATENT DOCUMENTS

| | | | |
|---|---|---|---|
| 5,996,322 A | 12/1999 | La Barre | 53/561 |
| 7,571,585 B2 | 8/2009 | Till | 53/167 |

(Continued)

FOREIGN PATENT DOCUMENTS

| | | | |
|---|---|---|---|
| CN | 1179134 | 4/1998 | B65B 3/02 |
| DE | 10 2006 035 109 | 1/2008 | B65G 1/04 |
| EP | 1 837 157 | 3/2007 | B29C 49/42 |

OTHER PUBLICATIONS

International Search Report, dated Sep. 1, 2009, PCT/EP2009/055099.

(Continued)

*Primary Examiner* — James Sanders
(74) *Attorney, Agent, or Firm* — Hayes Soloway P.C.

(57) ABSTRACT

A facility and process for processing containers includes a container production device for producing containers and at least one processing device which is disposed downstream from the container production device, for further processing of the containers. The container production device is synchronized with the processing device during regular operation. However, upon recognition of a malfunction in the processing device, synchronization of the container production device with the processing device is at least temporarily canceled.

11 Claims, 2 Drawing Sheets

(51) Int. Cl.
*B29L 31/00* (2006.01)
*B67C 3/22* (2006.01)

(56) References Cited

U.S. PATENT DOCUMENTS

2010/0011712 A1* 1/2010 Till .................................. 53/467
2010/0044185 A1 2/2010 Hahn .......................... 198/459.2

OTHER PUBLICATIONS

Notice Under Article 94 (3) EPC, Appln. No. 09 738 131.3-2307, dated Oct. 24, 2012 (11 pgs).

Office Action issued in corresponding Chinese Application dated Nov. 5, 2012 with English translation (21 pgs.).

* cited by examiner

FACILITY AND METHOD FOR PRODUCING CONTAINERS

BACKGROUND OF THE INVENTION

The present invention relates to a method for eliminating faults in a facility for producing and treating or processing containers having a container production device for producing containers and at least one treatment device for further processing the containers, and to a facility having a container production device and at least one treatment device for further processing the containers. Such facilities are used in particular for the production and immediately subsequent treatment or processing of containers.

In the prior art, methods and facilities are known, i.e. with a high processing rate (expressed in the number of processed or treated containers per unit time), in which containers are produced by transforming preforms made from a thermoplastic material, which have been heated to a suitable transformation temperature prior to being transformed. A production method accordingly comprises for example the storing of preforms, the supplying of preforms, the heating of preforms, the transformation of preforms, for example by means of blow moulding, the conveying or transporting of preforms between a store and a heating device and between the heating device and a container transformation device, e.g. a blow moulding device, and the transferring of containers to the downstream treatment devices. The treatment of containers may comprise one or more steps selected from a group including the following: filling containers, sterilising containers, labelling, inscribing and/or marking containers, closing containers, gathering together and/or onwardly transporting preforms or containers, packing containers, combining containers to form ready-to-sell packs and/or transportable units, combinations thereof or the like.

The invention can in particular also be used in a facility in which faults in regular operation occur more frequently in (one of) the treatment device(s) than in the container production device, and/or in a facility in which the average duration of a fault-induced break in operation in one treatment device is shorter than the average duration of an operating fault in a container production device. Examples of such faults are a running-out in the supply of pre-printed labels in labelling machines, destroying of containers when attaching a filling nozzle with excessive pressure or in an offset position onto a container opening in a filling device and, as occurs relatively frequently, an interruption in the supply of caps for closing the container in a closing device.

In such facilities, the individual processing or treatment devices are often synchronised with one another in regular operation, i.e. fault-free operation, that is to say that they are operatively coupled to one another in such a way that they are in synchronisation with regard to the number of containers processed in one process or processing step per unit time.

In such facilities for producing and processing containers, it is already prior art that, in the event of a fault occurring in one part of the facility or in one of the components of the production device or a treatment device, all the devices of the facility which are operated in synchronisation with one another are stopped. Once the fault has been eliminated, each device must be run up again from a stopped state to an operating state necessary for regular operation, including a production speed and possibly further operating parameters, such as heating or processing temperatures, and must be synchronised with one another. Even if the fault has occurred in a device block with a short run-up time, at least the time necessary for running up the device with the longest run-up time is required for the running-up and synchronisation of the facility as a whole.

In facilities having a container production device which comprises a blow moulding device for the stretch blow moulding of preforms made from thermoplastic plastic and an upstream heating device, a further problem lies in the fact that, once the facility has been run up again after an operating fault, the preforms located in the heating device are no longer suitable for the subsequent processing, e.g. due to temporary cooling or being kept too long in the heating device, and therefore must be discharged from the heating device and disposed of or recycled. The same also applies to the preforms located in the blow moulding device and not yet transformed into containers, which are likewise no longer suitable for the further processing if they remain in the blow moulding device until after the break in operation and must be discharged from the device and disposed of or recycled when regular operation is resumed.

The object of the present invention is to avoid or alleviate the problems which occur during fault elimination in facilities for processing containers. In particular, one object is to reduce the downtime after a fault and a fault-induced stoppage of a facility used in production and thus to achieve a longer production time and a higher degree of efficiency. Another object is to reduce, particularly in a facility using blow moulding, in the event of brief faults in a downstream treatment device, the number of preforms having to be discharged from the heating device and optionally also from the transformation device, i.e. the so-called preform losses, and also to reduce the number of containers having to be discharged from the transformation device.

SUMMARY OF THE INVENTION

In a facility for processing containers having a container production device for producing containers and at least one treatment device arranged downstream of the container production device for further processing the containers, wherein the container production device is synchronised with the treatment device in regular operation, the method according to the invention includes that the synchronisation between the container production device and the treatment device can be suspended and in particular that, when a fault in the treatment device is detected, the synchronisation between the container production device and the treatment device will be at least temporarily suspended. In addition or as an alternative, it may also be possible to at least temporarily suspend the synchronisation between the heating device and the container transformation device.

A fault is understood here to mean in particular faults that have already occurred; however, a reaction to faults occurring in future would be conceivable, for example when the user recognises that a certain machine behaviour or a certain actual state of the machine or of the processing will lead to a fault in the future.

The advantage achieved as a result of this lies in the fact that, by suspending the synchronisation, the container production device can continue to operate independently of the treatment device and the fault in the treatment device can be eliminated while the container production device continues to operate. There is therefore no need for the container production device to be run up again when a fault has occurred in one of the treatment devices. In a container production device comprising a blow moulding device and an upstream heating device, lower preform losses are achieved as a result, particularly in the case of brief faults. If the fault elimination in the treatment device takes less than the time necessary for the container production device to be run up again, then a shortening of the fault elimination is achieved, along with a longer production time and a higher degree of efficiency.

Preferably, the heated preforms are conveyed from the heating device to the container transformation device by means of a conveying device, and the transport path on which the preforms are conveyed from the heating device to the container transformation device remains constant. In contrast to buffer devices known from the prior art, which have a variable path or accumulation section and usually have a complicated mechanical system, in this case use is made of a conveying device with a transport path which is always constant, i.e. the transport path is constant independently of the machine operation and in particular independently of any faults that occur. In a corresponding manner, the containers that have already been transformed are conveyed to a further treatment unit and also the transport path between the container transformation device and the further treatment units is constant.

Particularly since the container production device comprises a heating device for heating preforms for the containers to a transformation temperature and a container transformation device for transforming, for example blow moulding, the preforms into containers, wherein the heating device and the container transformation device are synchronised with one another in regular operation, the treatment device can be stopped when a fault is detected therein. By stopping only the treatment device, the container production device can continue to operate and as a result there is no need for it to be run up again after a break in operation and preform losses can be reduced.

Preferably, a supply of preforms into the heating device and/or into the container transformation device can also be blocked when a fault in the treatment device is detected. The blocking of the supply of preforms shortly after or upon detecting a fault and for the time necessary to eliminate the fault reduces the preform losses in the heating device and in the container transformation device.

Preferably, the type of intervention can be predefined by the user. If, for example, the user or the machine recognises that a fault will be eliminated in a short period of time, for example within 10 seconds, it would be sufficient to discharge only a predefined number of blow-moulded containers and to introduce these again once the fault has been eliminated. If the user recognises that the elimination of a fault will take more time, the supply of preforms into the heating device may additionally also be stopped for example. Preferably, proposals for reactions will be presented to the user as a function of a fault, or these reactions will be carried out automatically as a function of the fault.

Preferably, after a fault in the treatment device has been detected, the operation of the heating device, for example the heating and transport operation in the heating device, and/or the operation of the container transformation device, in particular a heating operation in the case of a blow moulding device and also the transport operation, is continued. This avoids the need for running-up after a fault-induced break in interruption of the heating device and/or of the container transformation device. The continued operation also reduces the losses of preforms. Preferably, the containers produced during the fault-induced break in operation of the treatment device are additionally collected in an intermediate depot or a collecting device.

If the supply of preforms into the heating device and/or into the container transformation device has been blocked upon detection of a fault in the treatment device, preforms may be ejected from the heating device and/or preforms or containers may also be ejected from the container transformation device. Such an ejection preferably takes place immediately after the supply of preforms has been interrupted.

These measures help to ensure quality, since preforms heated under fault conditions and/or freshly formed or transformed containers of low quality will be separated out. In addition, the ejection of preforms or of containers means that the heating device and/or the container transformation device can be freshly filled with preforms when operation is run up again after a fault.

In a further advantageous manner, once the supply of preforms into the preform heating device and/or into the container transformation device has been blocked, the temperatures in these devices are held at the operating level. As a result, waiting times for reheating during the restarting of operation are avoided and thus the break in operation is shortened.

After the at least temporary suspension of the synchronisation, the fault in the treatment device can be eliminated, the treatment device can be restarted and the restart can be acknowledged and as a result the container production device can be informed about the restart. This means that preparations or steps for restarting the operation of the container production device can be carried out temporally in parallel with or at least partially at the same time as further steps during the running-up of the treatment device.

Furthermore, after elimination of the fault, the treatment device can be run up until the processing rate of the container production device is reached and then the treatment device can be synchronised with the container production device. Particularly when the run-up time of the treatment device is shorter than that of the container production device, these steps, which are carried out during continued operation of the container production device, save time for the run-up of the facility as a whole.

After the step of acknowledging the restart of the treatment device, the supply of preforms into the heating device and/or the supply of heated preforms into the container transformation device can already be carried out again in the container production device. Furthermore, following the synchronisation of the treatment device with the container processing device and upon achieving a complete refilling of the heating device with preforms, the supply of preforms from the heating device into the container transformation device can be carried out once again. Since the aforementioned steps in the container production device are carried out immediately after the restart of the treatment device has been acknowledged, these steps can be carried out at the same time as or in parallel with the further steps necessary in the treatment device for restarting regular operation, and thus time can be saved during the run-up of the facility and the downtime can be shortened.

The invention is implemented in a facility for processing containers having a container production device for producing containers and at least one treatment device for further processing the containers, said treatment device being arranged downstream of the container production device in the transport direction of the containers, wherein the facility is configured in such a way that the container production device is synchronised with the treatment device in regular operation. Furthermore, the container production device has a heating device for heating preforms, and a conveying device for conveying heated preforms from the heating device into a container transformation device.

According to the invention, the facility is configured in such a way that, during operation, the synchronisation of the container production device with the treatment device can be at least temporarily suspended. The synchronisation may be at least temporarily suspended in particular when a fault in the treatment device is detected. Preferably, the facility has a control device which brings about this suspension of the synchronisation, wherein the suspension is possible in particular also during continued production operation of the facility.

In such a container production device, the occurrence of a fault in the regular operating cycle is particularly disadvantageous because the handling of the preforms in the heating device and in the container transformation device is highly critical and susceptible to faults, and in particular it is sensitive to deviations from a nominal operating temperature. The suspension of the synchronisation between the container production device and the treatment device is then advantageous because the container production device can continue to be operated independently of the treatment device and thus losses of preforms that have become unusable can be reduced.

Preferably, the conveying device transports the preforms or the finished containers along a constant transport path.

Preferably, the container production device has a controllable preform discharging device for discharging preforms from the heating device. Also preferably, the facility has a conveying device and also a barrier device for blocking the supply of preforms into the container transformation device. The facility may be configured in such a way that, when a fault in the treatment device is detected, the barrier device and/or the preform discharging device can be activated. The activation of the barrier device or the blocking of the supply of preforms into the container transformation device protects the container transformation device and prevents the loss of preforms or of containers that have just been produced. The activation of the preform discharging device or the discharging of preforms from the heating device means that the heating device can be refilled with fresh preforms when operation is run up again, and thus the quality of the products and the functional reliability of the further processing steps can be ensured.

The facility may furthermore have a controllable stock supply device for supplying preforms from a storage device into the heating device. The controllable stock supply device means that the supply from the preform store into the heating device can be at least temporarily blocked, in particular when a fault in the treatment device is detected. This reduces losses of preforms in the heating device during the elimination of faults in the treatment device.

The facility may furthermore have a transfer device for transferring containers from the container production device into a first treatment device arranged downstream of the container production device. The transfer device allows an automatic transfer of containers into the treatment device.

The facility may furthermore have a controllable discharging device for discharging containers from the container transformation device. The controllable discharging device makes it possible to discharge containers and/or preforms which have possibly become unusable during the fault elimination in the treatment device in the container transformation device, and furthermore means that the container transformation device can be freshly refilled for restarting operation after a fault in the treatment device.

The facility may comprise a treatment device selected from a group of devices including filling devices for filling containers, labelling devices for labelling containers, closing devices for closing containers, packing machines, palletisers, combinations thereof or the like. The closing device may be configured in such a way that, in order to close the container, it introduces a specially provided and supplied container cap and thus seals off a container opening and securely connects the cap to the container. In practice, it has been found that faults occur relatively frequently in such closing devices, but these faults can be eliminated in a relatively short period of time, so that in this case too the suspension of the synchronisation of the container production device with one of the treatment devices is particularly advantageous.

The filling device, the labelling device and/or the closing device may be able to be synchronised with one another, in particular with regard to the processing rate. As a result, these devices can be incorporated particularly easily into the facility.

The filling device, the labelling device and/or the closing device may be configured in such a way that they can be run up in synchronisation with one another. As an alternative, these devices may also be configured in such a way that they can be run up individually and then synchronised with one another. By virtue of this configuration, it is particularly easy in terms of controlling to run up and synchronise the treatment device with the container production device.

BRIEF DESCRIPTION OF THE DRAWINGS

Further advantageous embodiments will emerge from the appended drawings, in which.

DETAILED DESCRIPTION OF THE INVENTION

Figure 1:
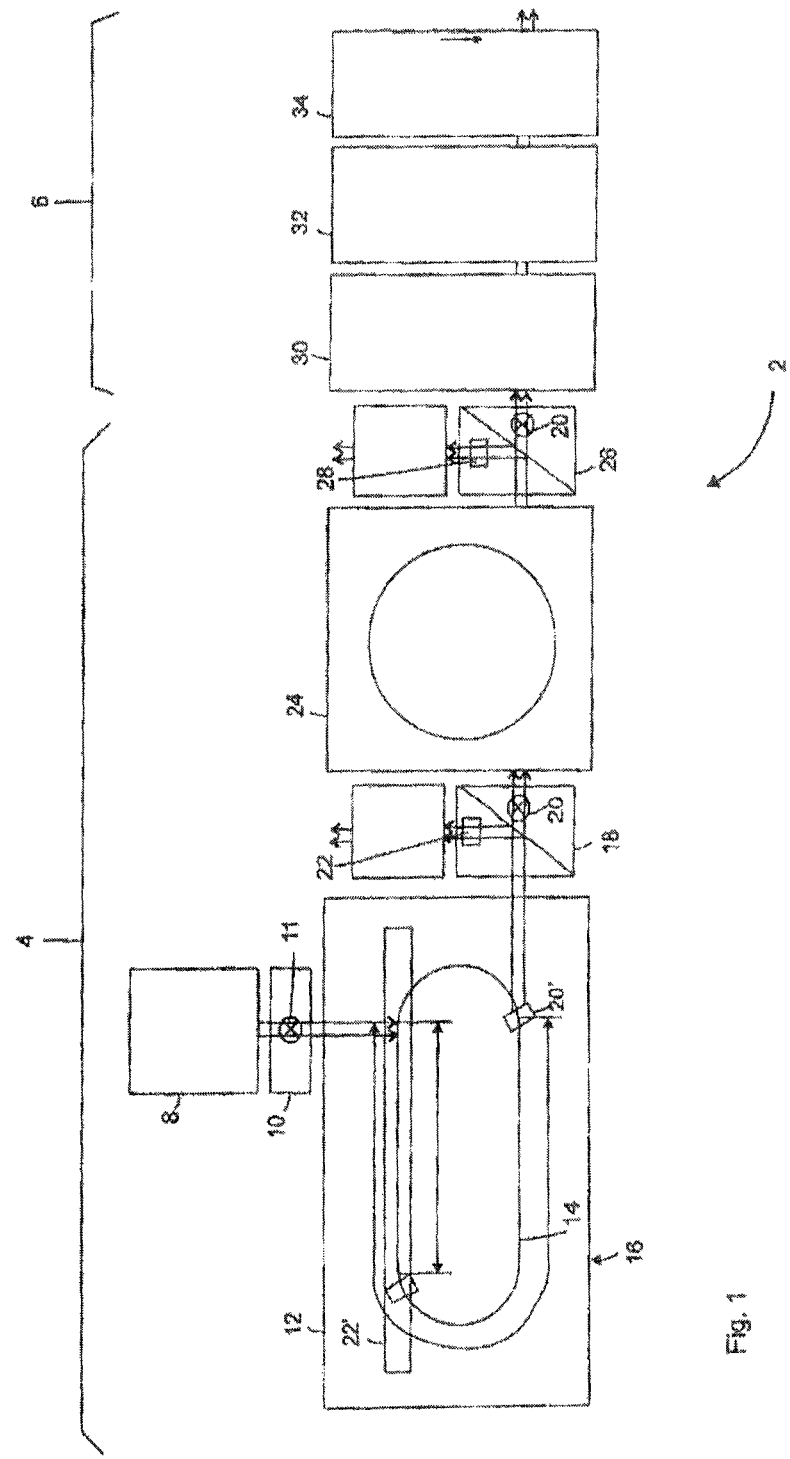
FIG. 1 shows a facility according to the invention for producing containers.

The embodiment shown in FIG. 1 is a facility 2 for producing and further treating containers. The facility 2 comprises the container production device 4 shown in the left-hand part of FIG. 1 and the container processing device 6 shown in the right-hand part of FIG. 1. The container production device 4 comprises a storage device 8, a stock supply device 10 and a heating device 12 with a preform transport means 14 arranged therein and a heating region 16. Also provided is a conveying device 18 for conveying preforms heated in the heating device 12 into a downstream blow moulding machine 24, the blow moulding machine 24 (container transformation device), a preform discharging device 22 for discharged preforms, which is controllably and operatively coupled to the conveying device 18, a transfer device 26 to the filler (container processing device 6), a discharging device 28 for blow-moulded containers, which is controllably and preferably operatively coupled to the conveying device 26, and a succession of several container processing devices 6, namely the filling device 30, a closing device 32 and a labelling device 34. However, the series of individual treatment units shown here is not indispensable.

During operation of the facility 2, container preforms, hereinafter referred to as preforms for short, are conveyed preferably by means of a conveyor belt from the preform store 8 to the preform stock supply 10, which conveys the preforms individually, one after the other and synchronised with the transport speed of the preform transport means 14 into the heating device 12 respectively at the preform processing rate of the heating device 12, more specifically into the preform transport means 14 in the heating device 12. In the heating device 12, the preforms are transported by the preform transport means 14 at a constant speed through the heating device 12 with its processing regions. The processing regions of the heating device 12 include an inlet region, in which the preforms are brought into a predetermined spacing from the previously transported and subsequently transported preform, and the actual heating region 16, of which the length and temperature provided therein are selected in such a way that the preforms in the heating region 16 are heated to a certain temperature for further processing. From one end of the preform transport means 14 in the heating device 12, the heated preforms are transferred or transported into a conveying device 18, which in regular operation of the facility 2 conveys the heated preforms into the blow moulding machine 24 individually, one after the other and synchronised with the transport speed or the processing rate of the blow moulding machine 24.

The conveying device 18 is operatively coupled to the preform discharging device 22 for preforms to be discharged, and to the actuatable or activatable preform barrier 20. The preform barrier 20 allows the preforms to pass unhindered from the preform conveyor 18 into the blow moulding machine 24 in the regular operating state of the facility 2, and in an actuated or activated state blocks the supply of heated preforms into the blow moulding machine 24. When the preform barrier 20 is activated, the preform discharging device 22 is also switched on or activated, so as to discharge heated preforms coming out of the heating device 12 when the preform barrier 20 is blocked and to supply them for reuse or to a recycling process.

Reference 11 denotes a further preform barrier, with which the supply of preforms to the heating device can be interrupted. Reference 20' denotes a further preform discharging device which is arranged in a sub-region of the heating device 12. During the heating of the preforms, due to crystallisation effects starting from a certain region of the heating device it is no longer possible to allow said preforms to cool again in order to be reused. The further preform discharging device is preferably arranged in front of this region so as in this way also to allow a reuse of some of the preforms that have already been heated. It is possible to control both the preform barriers 11 and 20 and also the respective preform discharging devices 22 and 20' independently of one another. The container discharging device 28 can preferably also be controlled independently of the preform discharging devices 22, 20'. In this way it is possible to react in a precisely adapted manner to different faults or different downtimes.

In the blow moulding machine 24, the supplied and heated preforms are expanded one after the other and individually in blow moulds to form containers. The blow mould is then opened and the container just formed is removed from the blow mould and output from the blow moulding machine 24 into a transfer device 26.

The transfer device 26 arranged at the outlet of the blow moulding machine 24 transports or transfers containers output from the blow moulding machine 24 into the first device of a series of possible treatment devices 6 arranged downstream, in this case to the filling device (filler) 30. The actuatable or activatable discharging device 28 is operatively connected to the outlet of the blow moulding machine 24 or the transfer device 26. The discharging device 28 brings about in the activated state the discharging of blow-moulded containers from the blow moulding machine 24. In the activated state, the discharging device 28 conveys away the blown containers discharged from the blow moulding machine 24 and supplies them for reuse or to a recycling process and thus relieves the load on the downstream treatment devices from the supply of containers, i.e. the discharging device 28 interrupts the supply of containers into the downstream treatment devices 6 (the filler 30). This interruption is necessary in the case where a fault occurs in one of the treatment devices 6, such as for example the filling device 30, the closing device 32 and the labelling device 34, and the device in question must be fully or partially emptied of containers for the purpose of eliminating the fault.

Figure 2:
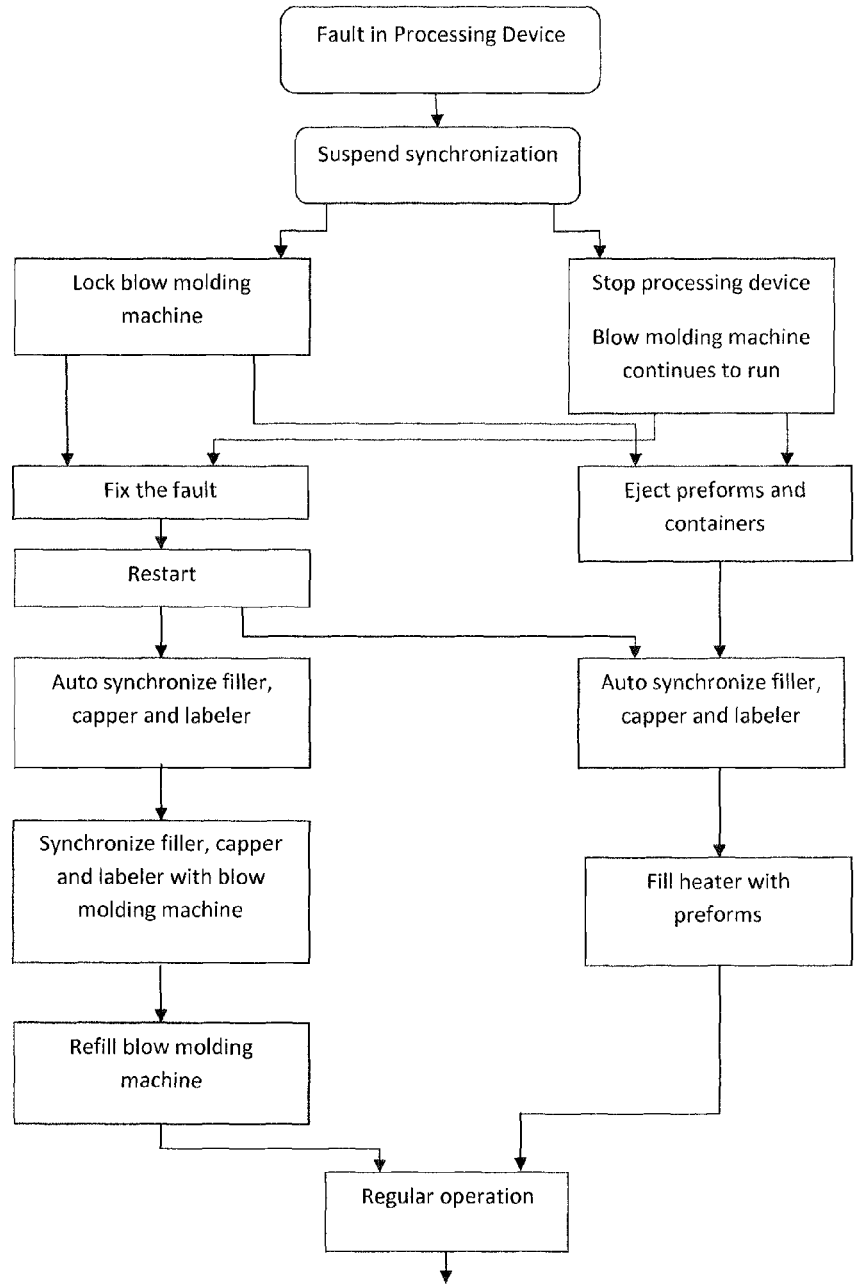
FIG. 2 shows a fault elimination method for the facility shown in FIG. 1.

FIG. 2 shows an embodiment of the method according to the invention, as carried out in the facility 2 shown in FIG. 1.

When a fault occurs in one of the processing devices 6 and is detected (step S2), then according to the invention the synchronisation in terms of the processing rate, called "blocking" in the specialist jargon, between the components of the container production device 4, including the oven 12 and the blow moulding machine 24 on the one hand side, and the processing devices 6, i.e. the filling device 30, closing device 32 and labelling device 34, is suspended (step S4). Once the synchronisation has been suspended in step S4, separate processes and steps take place in the container production device 4 and the container processing device 6 for the purpose of eliminating the fault and restarting regular operation of the facility, said processes and steps taking place partially at the same time or in parallel but not being synchronised with one another.

Once the fault has been detected (step S2) and preferably immediately after the synchronisation has been suspended (step S4), the preform barrier 20 is activated and thus the supply of preforms heated in the heating device 12 into the blow moulding machine 24 is interrupted (step S6). Also, once the synchronisation has been suspended (step S4), one, several or all of the treatment devices 4 (filling device 30, closing device 32 and labelling device 34) are stopped (step S12). It would also be possible to block the supply of preforms into the heating device 12 by means of the preform barrier 11.

While steps S6 and S8 are being carried out, the blow moulding machine 24 continues to operate and also the heating device 12 continues to operate, in particular the heating device of the oven remains switched on. At the same time as or directly after the activation of the preform barrier 20 (step S6), the preform discharging device 22 for discharging preforms from the heating device 12 and containers from the discharging device 28 for discharging blow-moulded containers from the blow moulding machine 24 are activated, and as a result preforms are ejected from the heating device 12 and containers are ejected from the blow moulding machine 24 (step S14). In addition, after the preform barrier 11 has been closed (step S6) and after the discharging device 28 has been activated (step S14) and thus the supply of containers into the processing devices has been interrupted, the fault is eliminated in the relevant processing device (step S8). Once the fault has been eliminated, the processing devices 6, including the one cured of the fault, are restarted and the restart is acknowledged, for example by the operator or else automatically (step S10).

Following the acknowledgement of the restart (step S10), the processing devices 6, i.e. filling device 30, closing device 32 and labelling device 34, are run up again, wherein their processing rates to increase according to a predefined time control (step S18). This step is also referred to as synchronisation.

Upon detection of the acknowledgement of the restart (step S10) or in a manner temporally offset therefrom (after the synchronisation), the preform stock supply 10 to the oven 12 and the preform barrier 20 to the blow moulding machine 24 are opened again (step S16). The oven 12 and, if this is filled, also the blow moulding machine 24, are then freshly filled with preforms (steps S20, S22).

Once the processing devices 6 have once again reached the processing rate corresponding to regular operation at the end of synchronisation, the processing devices 6 are resynchronised with the blow moulding machine 24 and with the container production device 4 as a whole (step S20).

The synchronisation of the processing devices 6 and the synchronisation with the container production device (step S18) may take place at least partially at the same time as the stock supply 10 to the oven is opened (step S16) and the oven 12 is filled with preforms (step S20).

It is possible to operate the facility 2 in such a way that new preforms are already being supplied to the inlet of the oven 12 while preforms are still being discharged by the preform discharging device 22 at the oven outlet, particularly when the fault in the working device in question has been able to be eliminated quickly and regular operation of the facility 2 was interrupted for a period of time shorter than the time necessary for a preform to pass through the oven 12.

When the processing devices 6 are once again synchronised with the container production device 4 (step S20), the discharging of the preforms from the oven 12 is ended (step S24) and the preform discharging device 22 is deactivated. As a result, preforms once again pass from the oven 12 into the blow moulding machine 24, so that the blow moulding machine is refilled (step S22). The filling of the blow moulding machine 24 takes at most the length of time necessary for one complete revolution of the blowing wheel. Once the blow moulding machine 24 has been refilled (step S22), containers are once again output at the outlet thereof and are conveyed for processing purposes into the processing device 6 (in particular into the filling device 30) which has already been synchronised. Regular production operation is thus assumed once more.

In the operation of facilities as shown in FIG. 1, faults occur relatively frequently as mentioned above for example in the closing device 32, e.g. due to a stoppage or break in the supply of caps. In one example, the elimination of such a fault (step S8) takes typically around 20 seconds. The synchronisation takes around 4 seconds. At a processing rate in regular operation of the facility 2 of typically 10 containers per second, the preform loss in the method according to the invention as shown in FIG. 2 is substantially dependent on the time taken to eliminate the fault (step S8). In the embodiment of FIG. 2, the preform loss for a fault lasting 20 seconds and synchronisation lasting 4 seconds, i.e. for a period of 24 seconds during which the preform barrier 20 is activated, is 240 pieces. The complete filling of the oven takes around 33 seconds and the complete filling of the blow moulding machine (one revolution of the blowing wheel) takes approx. 4 seconds.

In the entire above-mentioned fault elimination method from the prior art, in the event of a fault in a treatment device, usually simultaneously the preform barrier is closed, all the treatment devices are stopped and also the heating devices in the oven are switched off. The fault in the relevant treatment device is then eliminated and the restart thereof is acknowledged. Assuming the same fault as in FIG. 2, these processes take approx. 20 seconds.

Following the acknowledgement of the restart, the blow moulding machine is run up at a minimum speed of the blowing wheel. The preforms are then discharged from the oven at the maximum running speed of the blowing wheel, which including a ramp takes approx. 34 seconds. These processes take approx. 40 seconds from the time of acknowledgement.

Thereafter, the heating devices in the oven are switched on again, the oven passes into a standby mode, and only once the predefined heating temperature in the oven is reached is the preform barrier opened again. These processes take approx. 15 seconds. Once the preform barrier has been opened, the oven is refilled with preforms, which takes approx. 33 seconds, and then the blow moulding machine is refilled, which takes approx. 4 seconds. The overall duration of all of these processes customary for fault elimination in the prior art is 112 seconds.

In comparison to the method from the prior art, a break in operation which is 84 seconds shorter per fault or a production which lasts 84 seconds longer per fault is achieved by using the method according to the invention as shown in FIG. 2 for the fault discussed by way of example, and thus an accordingly higher degree of efficiency is achieved due to the longer production time. Lower preform losses are also achieved with the method according to the invention in the case of brief faults in one of the processing devices, depending on the time required to eliminate the fault. In the fault discussed by way of example, the preform loss is 28% lower than in the method according to the prior art.

In the method shown in the figures, it is also possible that, after a stoppage, the blow moulding machine runs at minimum speed (e.g. for one revolution of the blowing wheel) so as not to damage any moulds that are not closed. The subsequent empty running of the blow moulding machine can then take place at the production rate. Preferably, the blow moulding machine operates using servo technology.

All of the features disclosed in the application documents are claimed as essential to the invention in so far as they are novel individually or in combination with respect to the prior art.

The invention claimed is:

1. A method for eliminating faults and/or preventing faults in a facility for processing containers having a container production device for producing containers, wherein the container production device comprises a heating device for heating preforms for the containers to a transformation temperature and a blow molding device for transforming the preforms into containers, and the heating device and the blow molding device are coupled in synchronisation with one another in regular operation, wherein the facility includes at least one processing device arranged downstream of the container production device for further processing the containers, wherein the container production device is synchronised with the processing device in regular operation, wherein synchronisation between the container production device and the processing device can be at least temporarily suspended, and a mechanical blocking placed between components of the container production device and components of the processing device, wherein reactions to the fault will be carried out automatically and are a function of the fault including whether the fault will be eliminated in a short period of time or whether the elimination of the fault will take more time, and wherein the heated preforms are conveyed from the heating device to the blow molding device using a conveying device, and the transport path on which the preforms are conveyed from the heating device to the blow molding device remains fixed.

2. The method according to claim 1, wherein, when a fault in the processing device is detected or foreseen, this processing device is at least temporarily stopped or slowed.

3. The method according to claim 1, wherein a transport path between the blow molding device and a downstream processing device remains fixed.

4. The method according to claim 1, wherein, after a fault in the processing device has been detected or foreseen, a supply of preforms to the heating device and/or to the blow molding device is interrupted.

5. The method according to claim 1, wherein, when a fault in the processing device is detected, the operation of the heating device and/or the operation of the blow molding device is continued.

6. The method according to claim 1, wherein, once the supply of preforms to the heating device and/or to the blow molding device has been interrupted, preforms are ejected after the heating device and/or containers are ejected after the blow molding device.

7. The method according to claim 1, wherein, after elimination of a fault, the processing device is run up until the processing rate of the container production device is reached and then the processing device is synchronised with the container production device.

8. The method according to claim 1, wherein after a temporary suspension of synchronization between the container production device and the processing device, the blow molding device is run at minimum speed so as not to damage any molds that are not closed, whereupon subsequent empty running of the blow molding device can then take place at regular operation rate.

9. The method according to claim 1, wherein after temporary suspension of synchronization between the container production device and the processing device, upon detection of a restart, synchronized preform supply to the heating device and a mechanical block to the blow molding machine are opened, and the heater and the blow molding device are freshly filled with preforms.

10. The method according to claim 1, wherein once the processing devices reach a processing rate corresponding to regular operation, the processing devices are resynchronized with the blow molding device and with the container production device.

11. The method according to claim 1, wherein synchronization of the processing devices and synchronization with the container production device takes place at least partially at the same time as supply to the heater is restarted and the heater is filled with preforms.

* * * * *